(12) United States Patent
Jindal

(10) Patent No.: US 12,360,981 B2
(45) Date of Patent: Jul. 15, 2025

(54) RECORD-LEVEL LOCKS WITH CONSTANT SPACE COMPLEXITY

(71) Applicant: Amazon Technologies, Inc., Seattle, WA (US)

(72) Inventor: Himanshu Jindal, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 17/936,339

(22) Filed: Sep. 28, 2022

(65) Prior Publication Data

US 2024/0111751 A1 Apr. 4, 2024

(51) Int. Cl.
*G06F 16/23* (2019.01)
*G06F 16/22* (2019.01)
*G06F 16/25* (2019.01)

(52) U.S. Cl.
CPC ...... *G06F 16/2343* (2019.01); *G06F 16/2255* (2019.01); *G06F 16/2365* (2019.01); *G06F 16/256* (2019.01)

(58) Field of Classification Search
None
See application file for complete search history.

(56) References Cited

U.S. PATENT DOCUMENTS

| | | | |
|---|---|---|---|
| 10,409,864 B2 * | 9/2019 | Schreter | G06F 16/2322 |
| 10,608,992 B2 | 3/2020 | Jain et al. | |
| 10,761,946 B2 * | 9/2020 | Bensberg | G06F 11/1441 |
| 10,769,126 B1 * | 9/2020 | Hagerup | G06F 16/2453 |
| 11,106,653 B2 * | 8/2021 | Thomsen | G06F 16/2358 |
| 2009/0183159 A1 * | 7/2009 | Michael | G06F 9/467 718/101 |
| 2009/0300022 A1 * | 12/2009 | Little | G06F 16/2365 |
| 2011/0302143 A1 * | 12/2011 | Lomet | G06F 16/2322 707/704 |
| 2016/0147906 A1 * | 5/2016 | Schreter | G06F 16/2322 707/781 |

(Continued)

OTHER PUBLICATIONS

International Search Report and Written Opinion mailed Jan. 17, 2024 in PCT/US2023/074365, Amazon Technologies, Inc., pp. 1-10.

(Continued)

*Primary Examiner* — Aleksandr Kerzhner
*Assistant Examiner* — Anugeetha Kunjithapatham
(74) *Attorney, Agent, or Firm* — S. Scott Foster; Kowert, Hood, Munyon, Rankin & Goetzel, P.C.

(57) ABSTRACT

Systems and methods for implementing record locking for transactions using a probabilistic data structure are described. This probabilistic structure enables adding of data records without growth of the data structure. The data structure includes a hash table for each of multiple hash functions, where entries in the respective hash tables store a transaction time and locking state. To lock a record, each hash function is applied to a record key to provide an index into a respective hash table and a minimum of the values stored in the hash tables is retrieved. If the retrieved value is less than a transaction time for a transaction attempting to lock the record, locking is permitted and the transaction time is recorded to each of the hash tables. To commit the transaction, the probabilistic data structure is atomically updated as part of the commit operation.

20 Claims, 7 Drawing Sheets

(56) References Cited

U.S. PATENT DOCUMENTS

| | | | |
|---|---|---|---|
| 2017/0017435 A1* | 1/2017 | Peeters | G06F 3/067 |
| 2017/0250953 A1* | 8/2017 | Jain | G06F 21/552 |
| 2019/0340275 A1* | 11/2019 | Thomsen | G06F 16/2358 |
| 2021/0334257 A1* | 10/2021 | Bensberg | G06F 16/2255 |
| 2022/0413952 A1* | 12/2022 | Shu | G06F 16/2365 |

OTHER PUBLICATIONS

Han, Hyuck, et al., "Scalable Serializable Snapshot Isolation for Multicore Systems", 2014 IEEE 30th International Conference on Data Engineering, Mar. 31, 2014,, pp. 700-711, IEEE.

Cormode, Graham, et al., "An improved data stream summary: the count-min sketch and its applications", Journal of Algorithms, Apr. 1, 2005, pp. 58-75.

Cormode, Graham, "Count-Min Sketch," Retrieved from the Internet: URL:http://dimacs.rutgers.edu/-graham/pubs/papers/cmencyc.pdf [retrieved on Dec. 1, 2023], 5 pages.

* cited by examiner

RECORD-LEVEL LOCKS WITH CONSTANT SPACE COMPLEXITY

BACKGROUND

Traditional databases offer the ability to lock objects within a transaction. Applications do this implicitly by performing read or write operations within the scope of a transaction. Databases track the records touched within a transaction using record-level locks and if another transaction attempts to perform a read or write operation on the same records, all but one transaction is aborted.

Traditional databases store data on disk and index it in memory and/or disk. This indexing limits the size of these databases but allows performing operations such as locking efficiently and conveniently since all data resides in one place. A traditional locking implementation uses one lock per record; if two transactions try to obtain the same lock, one of them is aborted. This has a constant runtime complexity but storage complexity proportional to the number of records in the data set.

For data lakes, where the data can be up to exabytes in scale and can reside across a great many files in a distributed storage system, traditional locking mechanisms are impractical. The number of records in such data lakes is immensely large causing traditional locking to be too expensive.

Figure 1:
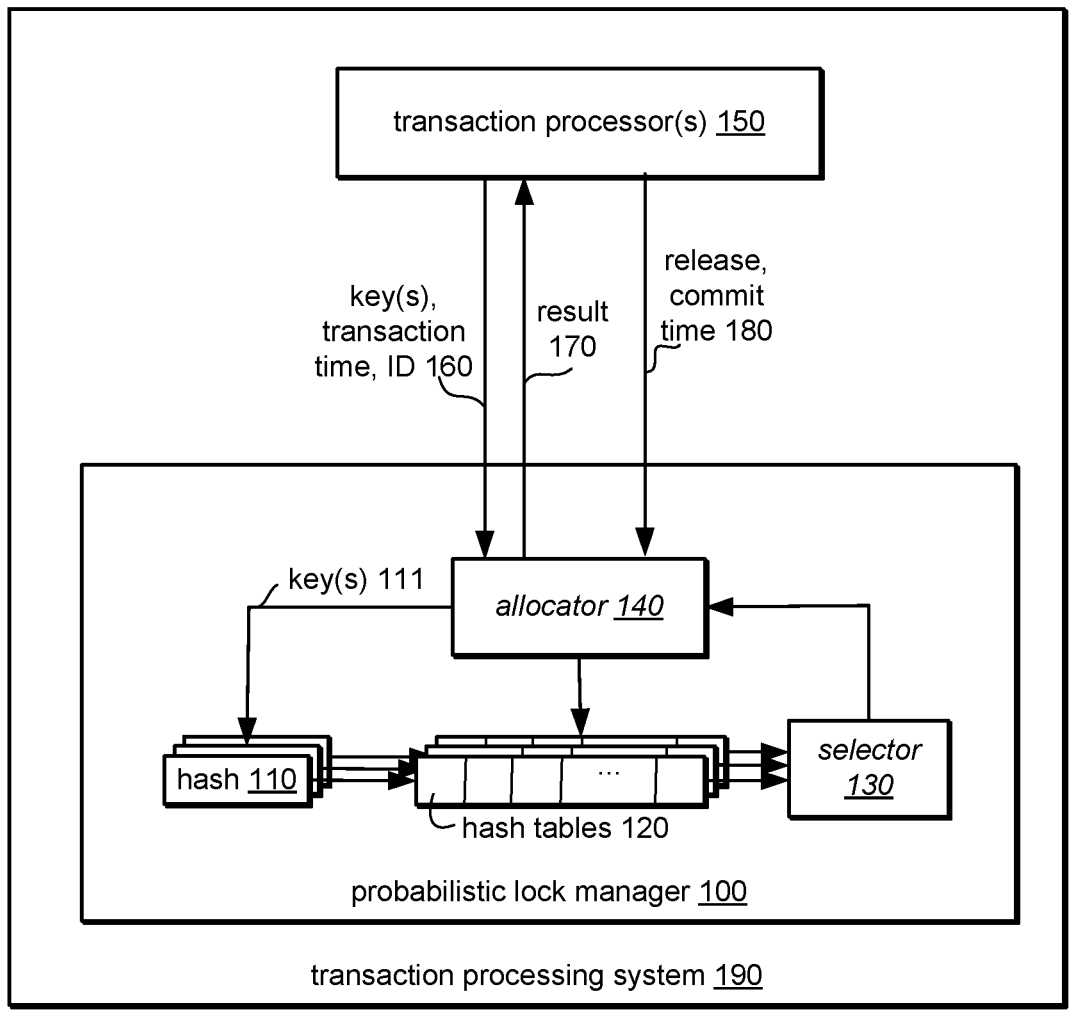
FIG. 1 illustrates a logical block diagram of a processing system including a transaction processor that accesses a probabilistic lock manager, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Traditional databases offer the ability to lock objects within transactions. Applications do this implicitly by performing read or write operations within the scope of an individual transaction. Databases track the records accessed within a transaction using record-level locks such that if another transaction attempts to perform a read or write operation on the same records, all but one transaction is aborted.

Traditional databases store data on disk and index the data in memory and/or disk. This indexing places practical upper bounds on the size of these databases but allows performing operations such as locking efficiently and conveniently since all locking data resides in one place. A traditional locking implementation uses one lock per record; if two transactions try to obtain the same lock, one of them is aborted. This has a constant runtime complexity but storage complexity proportional to the number of records in the data set.

For data lakes, where the data can be up to exabytes in scale and can reside across a great many files in a distributed storage system, traditional locking mechanisms are impractical. The number of records in such data lakes may be immensely large causing traditional locking to be too expensive.

Systems and methods described herein may be employed in different combinations and in various embodiments to implement record locking for transactions using a probabilistic data structure which enables adding of data records without requiring growth of the data structure. A Count-Min Sketch (CM sketch or CMS) is a probabilistic data structure that may be used to efficiently track counts across a large number of keys or input values. A CMS makes use of multiple universal hashing functions, commonly pairwise independent hash functions, to minimize collisions and ensure that overcounting errors are mitigated. In the various embodiments described herein, a CMS is used to track transaction start times and transaction commit times rather than counts as is traditionally performed using a CMS. To facilitate tracking of times, the traditional counting function is replaced with a time updating function that allows the technique to overestimate locking conflicts in the worst case. Using this approach, a locking manager may detect locking conflicts with constant storage demands independent of data set size.

A hash table may be provided for each of the hash functions, with each hash table providing a same number of entries. The total number of hash entries for all tables may be selected to support a maximum desired level of locking concurrency and a maximum level of lock collision overestimation, in various embodiments. Each hash table entry corresponds to a potential active lock, where at any moment in time, each entry may store one of (a) a transaction ID for a transaction that holds the lock, if the entry indicates a locked state, or (b) a commit time for a most recent commit of a transaction if the entry indicates a locked state. Each entry may be initialized to indicate an unlocked state without a most recent commit time. In some embodiments, this initial state may be a third state, in addition to locked and unlocked states, while in other embodiments the initial state may be encoded as a special commit time value such as a negative of zero time value. It should be understood that these are merely examples of possible state encodings and any number of encodings may be envisioned.

A transaction may allocate a lock for a record if (a) a start time of the transaction is greater than the last commit time of an unlocked transaction, or (b) if the record has never been previously locked. A transaction may not allocate a lock for a record if (a) a start time of the transaction is not greater than the last commit time of an unlocked transaction, or (b) another transaction currently holds a lock for the record.

A transaction may need to access multiple records and therefore must lock all records prior to commit. A transaction must then read the CMS for each key of each record to be locked and apply each hash function to each key to access an entry of each hash table for each key. If any accessed entry indicates a locked state, the allocation has failed and the transaction aborted. Otherwise, the oldest last commit time for each key may be determined using commit times stored in each entry indicating an unlocked state. If all determined entries are less than, or older than, the transaction time, then a lock for each key may be allocated using the respective entries associated with the determined oldest commit times. If a determined oldest entry are not less than, or older than, the transaction time, the allocation has failed and the transaction aborted, in some embodiments Once locks are allocated for all records, the transaction may be atomically committed. The CMS data structure may be committed, in some embodiments, along with the atomic commission of the transaction. Once the transaction is committed, the transaction may release each of the allocated locks by updating the respective entries to indicate an unlocked state with a last commit time determined by the commit time of the transaction.

FIG. 1 illustrates a logical block diagram of a transaction processing system including a transaction processor that accesses a probabilistic lock manager, according to some embodiments. The transaction processing system 190 may include a probabilistic lock manager 100 that includes probabilistic data structures and is accessed by transaction processor(s) 150 to provide locking semantics for transactions.

In some embodiments, the transaction processor 150 may submit a lock request 160 to the probabilistic lock manager 100, the request including key(s) identifying records to lock, a transaction time and a transaction identifier. An allocator 140 of the probabilistic lock manager 100 may provide the key(s) to a set of universal hash functions 110 to generate, for each of the key(s), respective indexes into a set of hash tables 120, in some embodiments. Entries in the set of hash tables 120 selected by the respective indexes are then provided to a selector 130 which either indicates to the allocator 140 that allocation is not possible or indicates a controlling entry for a given key, the controlling entry being an entry most likely associated with a previous commit of the record associated with the key.

If the allocator 140 determines that any of the key(s) cannot be allocated according to results provided from the selector 130, the allocator will send a result 170 to the transaction processor indicating failure of allocation. If, however, all key(s) are available for allocation, the allocator may update the respective controlling entries selected by the selector 130 with the provided transaction identifier to indicate that the record(s) have entered a locked state. The allocator may then send a result 170 to the transaction processor(s) 10 indicating successful allocation of the requested locks.

Upon completion of the transaction, the transaction processor(s) 150 may send a release request 180, including a commit time, to the probabilistic lock manager 100. The probabilistic lock manager 100 may then update the controlling entries of each of the locks to indicate an unlocked state with a most recent commit time set to the commit time of the transaction.

Figure 2:
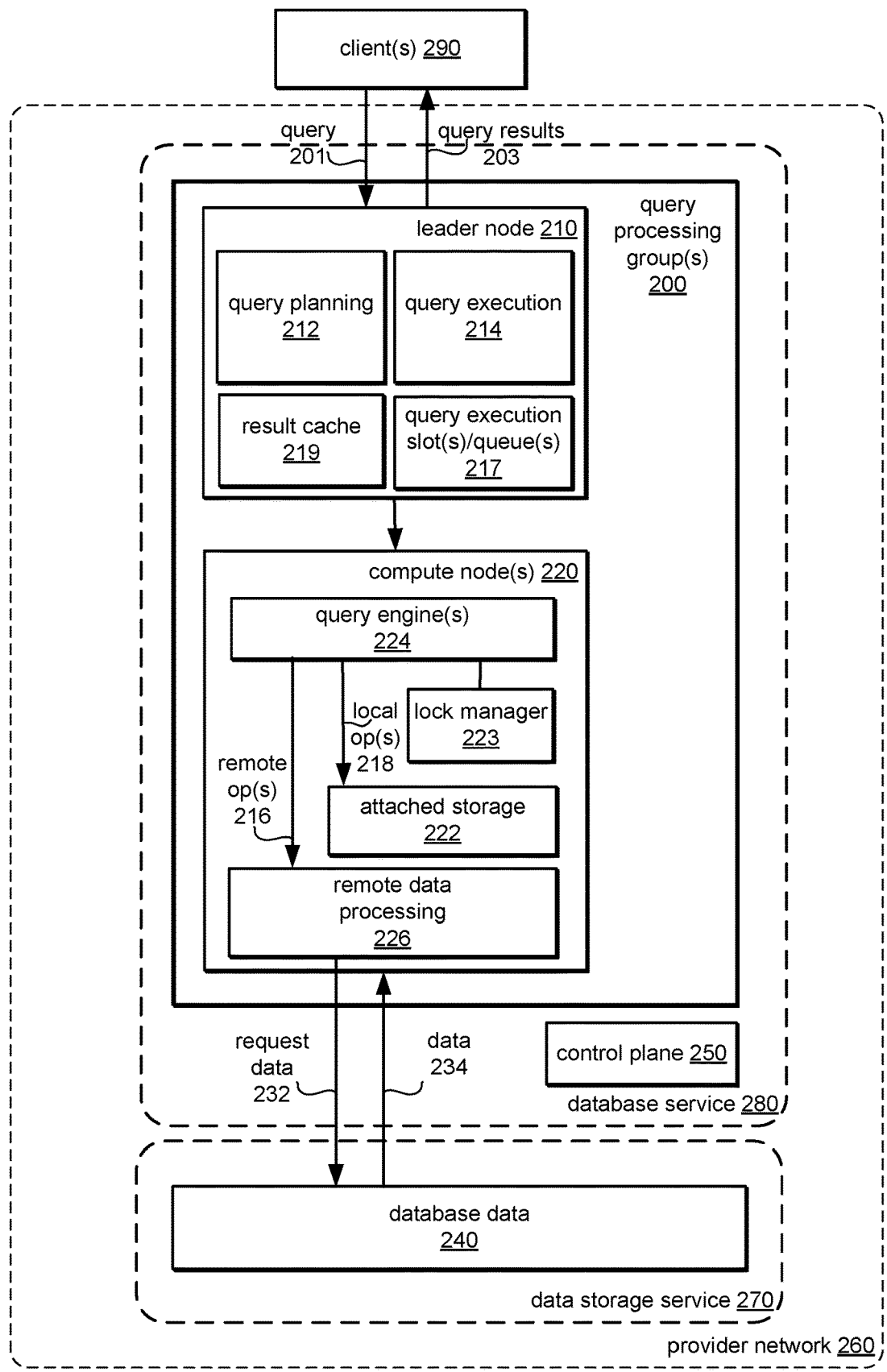
FIG. 2 is a logical block diagram illustrating an example of query processing groups performing queries to database data, according to some embodiments.

FIG. 2 is a logical block diagram illustrating an example of query processing groups performing queries to database data, according to some embodiments. Provider network 260 may be a private or closed system or may be set up by an entity such as a company or a public sector organization to provide one or more services (such as various types of cloud-based storage) accessible via the Internet and/or other networks to clients 290.

Provider network 260 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network 260. The provider network 260 can be formed as a number of regions, where a region is a separate geographical area in which the cloud provider clusters data centers. Each region can include two or more availability zones connected to one another via a private high speed network, for example a fiber communication connection.

An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 260 via a publicly accessible network (e.g., the Internet, a cellular communication network). Regions are connected to a global network which includes private networking infrastructure (e.g., fiber connections controlled by the cloud provider) connecting each region to at least one other region. The provider network 260 may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 260 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 260 may implement various computing resources or services, such as database service(s) 280, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given system or service component (e.g., a component of database service 280 or data storage service 270) may be implemented by a particular node or may be distributed across several nodes. In some embodiments, a given node may implement the functionality of more than one service system component (e.g., more than one data store component).

Database services 280 may be various types of data processing services that perform general or specialized data processing functions (e.g., anomaly detection, machine learning, data mining, big data querying, or any other type of data processing operation). For example, in at least some embodiments, database services 280 may include a map reduce service that creates clusters of processing nodes that implement map reduce functionality over data stored in the map reduce cluster as well as data stored in data storage service 270. In another example, database service 280 may include various types of database services (both relational and non-relational) for storing, querying, and updating data. Such services may be enterprise-class database systems that are highly scalable and extensible. Queries may be directed to a database in data database service 280 that is distributed across multiple physical resources, and the database system may be scaled up or down on an as needed basis.

Database service 280 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 280 may implement, in some embodiments, a data warehouse service, that utilizes another data processing service, to execute portions of queries or other access requests with respect to data that is stored in a remote data store, such as data storage service(s) 270 (or a data store external to provider network 260) to implement distributed data processing for distributed data sets.

In at least some embodiments, database service 280 may be a data warehouse service. Thus in the description that follows database service 280 may be discussed according to the various features or components that may be implemented as part of a data ware house service, including control plane 250, proxy service (not shown), and query processing groups 200. Note that such features or components may also be implemented in a similar fashion for other types of database services and thus the following examples may be applicable to other types of database service 280. Database service 280 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 280 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data.

A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Figure 7:
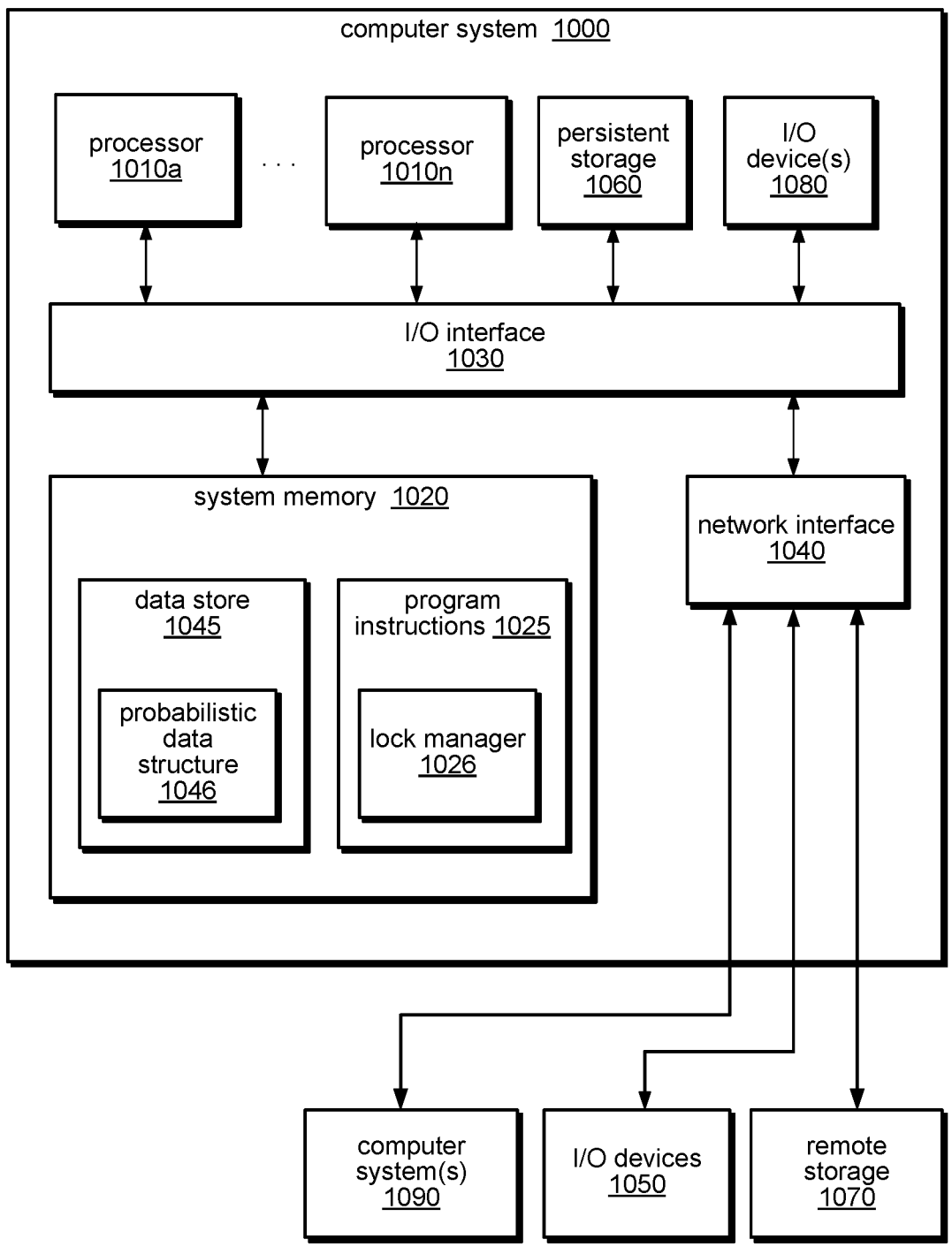
FIG. 7 is a block diagram illustrating an example computing system, according to some embodiments.

Database service 280 may be implemented by a large collection of computing devices, such as customized or off-the-shelf computing systems, servers, or any other combination of computing systems or devices, such as the various types of systems 1000 described below with regard to FIG. 7. Different subsets of these computing devices may be controlled by control plane 250. Control plane 250, for example, may provide a control interface to clients or users who wish to interact with the processing groups, such as query processing groups 200 managed by control plane 250. For example, control plane 250 may generate one or more graphical user interfaces (GUIs) for clients, which may then be utilized to select various control functions offered by the control interface for the query processing groups 200 hosted in the database service 280. Control plane 250 may provide or implement access to various metrics collected for the performance of different features of database service 280, including processing cluster performance, in some embodiments.

As discussed above, various clients (or customers, organizations, entities, or users) may wish to store and manage data using a database service 280. Query processing groups 200 may respond to various requests, including write/update/store requests (e.g., to write data into storage) or queries for data (e.g., such as a Server Query Language request (SQL) for particular data). For example, multiple users or clients may access a processing cluster to obtain data warehouse services.

For databases manually managed by users, database service 280 may provide network endpoints directly to the clusters which allow the users manage in order to implement client applications that send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters.

In at least some embodiments, database service 280 may implement proxy service to provide access to databases (e.g., data warehouses) hosted in database service 280. For databases managed by database service 280, database service 280 may provide database endpoints (e.g., network endpoints) for a hosted database. Database endpoints may not provide direct access to a particular query processing group 200, as the processing group used to respond to such requests (e.g., queries) may change according to various scaling techniques. Instead, client applications may utilize the database endpoint for a database to be included in various client applications or other communications for database access so that proxy service can direct the requests to the appropriate processing cluster without the client application having to be altered every time a change in processing cluster (e.g., scaling operations) are performed by database service 280. In this way, database service 280 can perform scaling and other management operations without interfering with client applications.

Query processing groups 200 hosted by database service 280 may provide an enterprise-class database query and management system that allows users to send data processing requests to be executed by the groups 200, such as by sending a query. Query processing groups 200 may perform data processing operations with respect to data stored locally in a processing cluster, as well as remotely stored data. For example, data storage service 270 implemented by provider network 260 that stores remote data, such as backups or other data of a database stored in a cluster. In some embodiments, database data 240 may not be stored locally in a query processing group 200 but instead may be stored in data storage service 270 (e.g., with data being partially or temporarily stored in query processing group 200 to perform queries). Queries sent to a processing cluster 23 (or routed/redirect/assigned/allocated to query processing group(s)) may be directed to local data stored in the processing cluster and/or remote data. Therefore, processing clusters may implement local data processing, such as local data processing, to plan and execute the performance of queries with respect to local data in the processing cluster, as well as a remote data processing client.

Database service 280 may implement different types or configurations of processing clusters. For example, different configurations may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations of query processing groups 200 may offer different execution times. Different configurations of query processing groups 200 may be maintained in different pools of available processing clusters to be attached to a database. Attached processing clusters may then be made exclusively assigned or allocated for the use of performing queries to the attached database, in some embodiments. The number of query processing groups 200 attached to a database may change over time according to the selection techniques discussed below.

In some embodiments, database service 280 may have at least one query processing group attached to a database, which may be the "primary group." Primary groups may be reserved, allocated, permanent, or otherwise dedicated processing resources that store and/or provide access to a database for a client, in some embodiments. Primary groups, however, may be changed. For example, a different processing cluster may be attached to a database and then designated as the primary database (e.g., allowing an old primary group to still be used as a "secondary" processing cluster or released to a pool of processing clusters made available to be a attached to a different database). Techniques to resize or change to a different configuration of a primary group may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary group. Control plane 250 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored separate from database service 280 in data storage service 250, in some embodiments. For example, a leader node, or other processing cluster component, may implement a backup agent or system that creates and store database backups for a database to be stored as database data 240 in data storage service 270. Database data 240 may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data 240 may be maintained in some embodiments, so that the latest database data 240 may, for instance, be obtained by a processing cluster in order to perform queries. In at least some embodiments, database data 240 may be treated as the authoritative version of data, and data stored in query processing groups 200 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, a format independent data processing service may access data objects stored in data storage services via the programmatic interfaces.

Generally speaking, clients 250 may encompass any type of client that can submit network-based requests to provider network 260 via a network, including requests for storage services (e.g., a request to query a database service 280, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 280 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 260. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 260 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s)) to and receive responses from provider network 260 via network 260. In various embodiments, network 260 may encompass any suitable combination of networking hardware and protocols necessary to establish network-based-based communications between clients 250 and provider network 260. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 260 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 260. It is noted that in some embodiments, clients 250 may communicate with provider network 260 using a private network rather than the public Internet. In some embodiments, clients of data processing services and/or data storage service(s) 270 may be implemented within provider network 260 (e.g., an application hosted on a virtual computing resource that utilizes a data processing service to perform database queries) to implement various application features or functions and thus various features of client(s) 250 discussed above may be applicable to such internal clients as well.

As illustrated in the example of FIG. 2, a query processing group 200 may include a leader node 210 and compute node(s) 220, which may communicate with each other over an interconnect (not illustrated). Leader node 210 may implement query planning 212 to generate query plan(s), query execution 214 for executing queries on query processing group 200 that perform data processing that can utilize remote query processing resources for remotely stored data (e.g., by utilizing one or more query execution slot(s)/queue(s) 217). As described herein, each node in a processing cluster 200 may include attached storage, such as attached storage 222 on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 200 is a leader node as illustrated in FIG. 2, but rather different nodes of the nodes in processing cluster 200 may act as a leader node or otherwise direct processing of queries to data stored in processing cluster 200. While nodes of processing cluster may be implemented on separate systems or devices, in at least some embodiments, some or all of processing cluster may be implemented as separate virtual nodes or instance on the same underlying hardware system (e.g., on a same server).

Leader node 210 may manage communications with clients 290. Leader node 710 may communicate with proxy service (not shown) and may receive query 201 and return query results 203 to proxy service (instead of communicating directly with a client application).

Leader node 210 may be a node that receives a query 201 from various client programs (e.g., applications) and/or subscribers (users) (either directly or routed to leader node 210 from proxy service), then parses them and develops an execution plan (e.g., query plan(s)) to carry out the associated database operation(s)). More specifically, leader node 210 may develop the series of steps necessary to obtain results for the query. Query 201 may be directed to data that is stored both locally within processing cluster 200 (e.g., at one or more of compute nodes 220) and data stored remotely. Leader node 210 may also manage the communications among compute nodes 220 instructed to carry out database operations for data stored in the processing cluster 200. For example, node-specific query instructions 204 may be generated or compiled code by query execution 214 that is distributed by leader node 210 to various ones of the compute nodes 220 to carry out the steps needed to perform query 201, including executing the code to generate intermediate results of query 201 at individual compute nodes may be sent back to the leader node 210. Leader node 210 may receive data and query responses or results from compute nodes 220 in order to determine a final result 203 for query 201.

A database schema, data format and/or other metadata information for the data stored among the compute nodes, such as the data tables stored in the cluster, may be managed and stored by leader node 210. Query planning 212 may account for remotely stored data by generating node-specific query instructions that include remote operations to be directed by individual compute node(s). Although not illustrated, in some embodiments, a leader node may implement burst manager to send 206 a query plan generated by query planning 212 to be performed at another attached processing cluster and return results 208 received from the burst processing cluster to a client as part of results 203.

In at least some embodiments, a result cache 219 may be implemented as part of leader node 210. For example, as query results are generated, the results may also be stored in result cache 219 (or pointers to storage locations that store the results either in primary processing cluster 200 or in external storage locations), in some embodiments. Result cache 219 may be used instead of other processing cluster capacity, in some embodiments, by recognizing queries which would otherwise be sent to another attached processing cluster to be performed that have results stored in result cache 219. Various caching strategies (e.g., LRU, FIFO, etc.) for result cache 219 may be implemented, in some embodiments. Although not illustrated in FIG. 2, result cache 219 could be stored in other storage systems (e.g., other storage services, such as a NoSQL database) and/or could store sub-query results.

Processing cluster 200 may also include compute nodes 220. Compute nodes 220, may for example, be implemented on servers or other computing devices, such as those described below with regard to computer system 1000 in FIG. 7, and each may include individual query processing "slices" defined, for example, for each core of a server's multi-core processor, one or more query processing engine(s) 224, such as the transaction processor(s) 150 of FIG. 1, to execute the instructions 204 or otherwise perform the portions of the query plan assigned to the compute node. Query engine(s) 224 may access a lock manager 223, such as the probabilistic lock manager 100 of FIG. 1, and a certain memory and disk space in order to process a portion of the workload for a query (or other database operation) that is sent to one or more of the compute nodes 220. Query engine 224 may access attached storage, such as 222, to perform local operation(s), such as local operations 218. For example, query engine 224 may scan data in attached storage 222, access indexes, perform joins, semi joins, aggregations, or any other processing operation assigned to the compute node 220.

Query engine 224 may also direct the execution of remote data processing operations, by providing remote operation(s), such as remote operations 216, to remote data processing clients, such as remote data processing client 226. Remote data processing clients 226 may be implemented by a client library, plugin, driver or other component that sends request sub-queries to be performed by data storage service 270 or requests to for data, 232. As noted above, in some embodiments, Remote data processing clients 226 may read, process, or otherwise obtain data 234 in response from database data 240 in data storage service 270, which may further process, combine, and or include them with results of location operations 218.

Compute nodes 220 may send intermediate results from queries back to leader node 210 for final result generation (e.g., combining, aggregating, modifying, joining, etc.). Remote data processing clients 226 may retry data requests 232 that do not return within a retry threshold.

Attached storage 222 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 3:
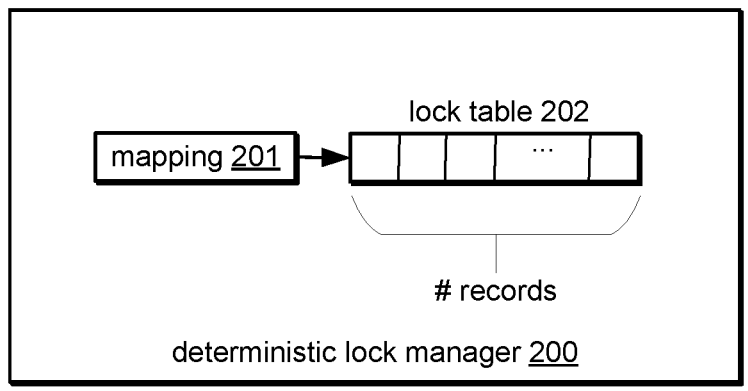
FIG. 3 is a block diagram illustrating memory requirements for a traditional lock manager and a probabilistic lock manager, according to some embodiments.
Figure 3:
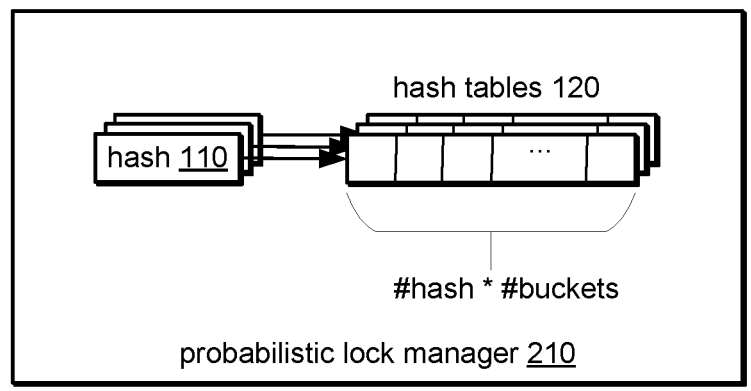

FIG. 3 is a block diagram illustrating memory requirements for a traditional lock manager and a probabilistic lock manager, according to some embodiments. A deterministic lock manager 200 may include a lock table 202 which may be scaled by a number of records for which locks may be obtained. As records are added, the lock table 202 may be extended to support the additional records. A mapping function 201 is provided to allow record identifiers, or keys, to be mapped to various elements in the lock table 202. A deterministic lock manager, therefore, requires lock data storage proportional to a number of records able to be locked.

In contrast, a probabilistic lock manager 210, such as the probabilistic lock manager 100 of FIG. 1, includes multiple hash tables, generally of similar or identical size. Each of these hash tables is associated with one of a set of universal, or pair-wise independent, hash functions. The probabilistic lock manager 210 identifies a controlling lock entry for a record using the set of universal hash functions 110. Therefore, the probabilistic lock manager 210 requires lock data storage proportional to a number of hash functions and may not be proportional to a number of records able to be locked. Thus, a probabilistic lock manager 210 is suitable in applications where a number of records able to be locked is sufficiently great and to render deterministic lock managers impractical.

Figure 4:
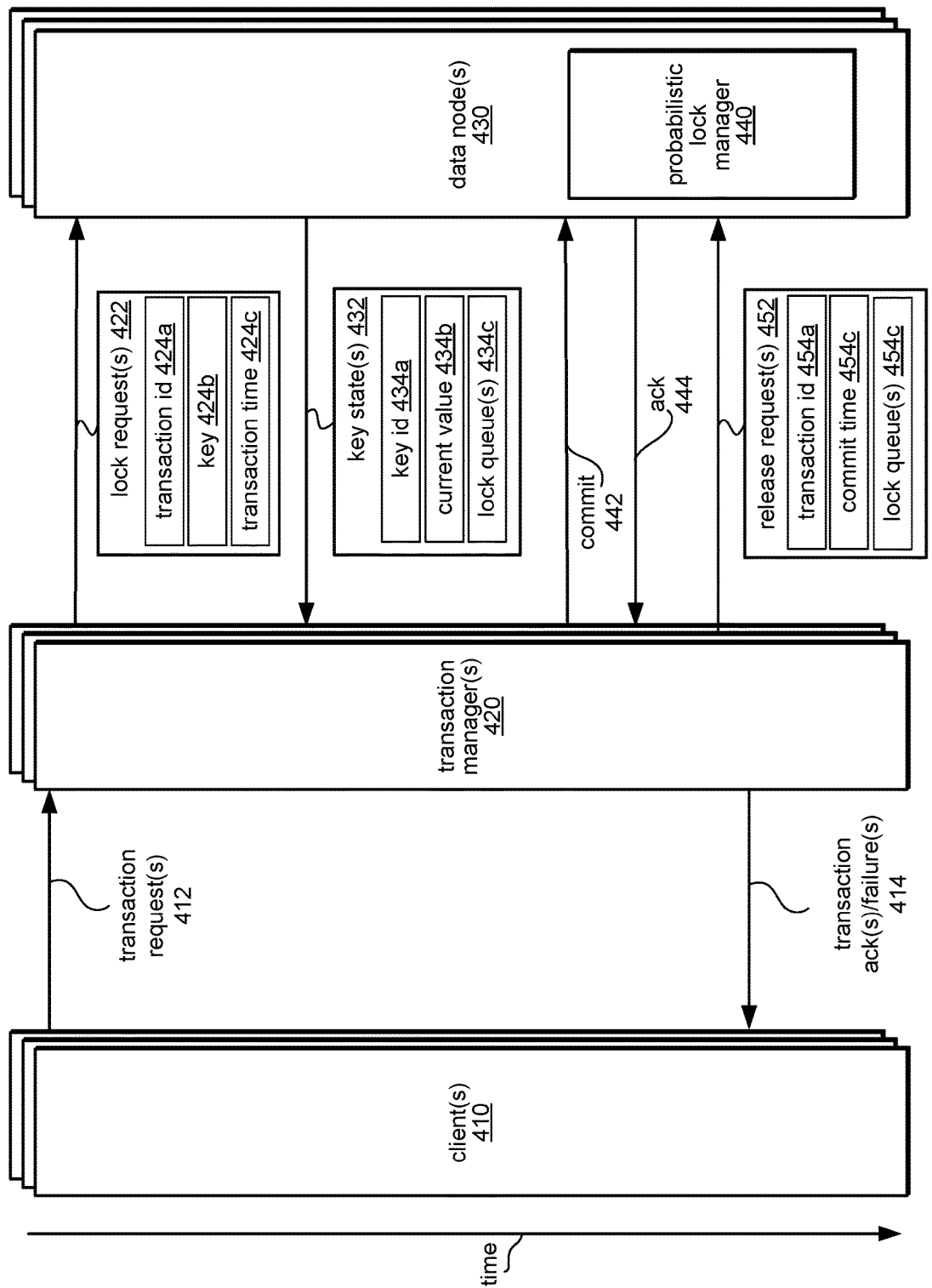
FIG. 4 is a block diagram illustrating interactions among a client, transaction manager and data node as part of providing processing of transactions using a probabilistic lock manager, according to some embodiments.

FIG. 4 is a block diagram illustrating interactions among a client, transaction manager and data node as part of providing non-blocking processing of federated transactions for distributed data partitions, according to some embodiments. Client(s) 410 may be similar to clients 250 described above in FIG. 2 or any other client which may communicate with transaction managers 420 to perform non-blocking processing of federated transactions for distributed data partitions. As illustrated in FIG. 4, client(s) 410 may submit transaction request(s) 412 to a respective transaction manger 420 to be performed. As noted earlier, transaction requests may fully specify the transaction identifying the data nodes 430 upon which a lock to a key is to be obtained in order to perform the transaction.

Based on the specified keys in the transaction, transaction manager(s) 420 may send to a probabilistic lock manager(s) 440 within the data node(s) 430 lock request(s) 422 to lock the identified keys at data nodes 430, in various embodiments. Lock requests 422 may include a unique transaction identifier 424$a$, a key identifier 424$b$ and a transaction time 424$c$.

As each lock request 422 may send various ones of the metadata 424 described above, data nodes 430 may response with key states 432 to the transaction managers in response to receiving the lock requests 422. Key states 432 may include, in various embodiments, the key identifier 434$a$, the current value 434$b$ for the data specified by the key and lock queues 434$c$ (which may include the lock requests 422 received for that key from any transaction manager 420 for any transaction at the time the lock request is received).

As noted above, after sufficient rounds of lock requests, transaction managers 420 may identify the same transaction to commit. One or more of the transaction managers 420 may send a commit request 442 to data nodes 430 maintaining the keys for to perform transaction to commit the transaction. As transaction managers 420 may be trusted to reach the same decision, data nodes 430 may always comply with a commit request (unless the transaction has already been committed in response to which a confirmation of the transaction identified as committed may be sent back to the transaction manager 420). The commit 442 may include the transaction id to commit. The data node(s) 430 may commit probabilistic data for the lock manager 440 along with the transaction. Similarly, acknowledgment 444 may include the transaction identifier of the transaction committed. Transaction managers 420 may then send respective successful acknowledgments 414 to the client 410 with the committed transaction, and failures to the client(s) 410 with the unsuccessful transaction(s). In some embodiments, transaction managers 420 may send acknowledgments of a committed transaction 414 to a client (or failure) without receiving acknowledgments of a commit 444 from the data nodes 430 of the transaction committed. The transaction manager(s) 420 may then send a release request 452 to data nodes 430. The release request 452 may include, in various embodiments, the transaction identifier 454$a$, the commit time 454$b$ and lock queues 454$c$ (which may include the lock requests 422 received for that key from any transaction manager 420 for any transaction at the time the lock request is received).

The examples of a transaction service providing non-blocking processing for federated transactions for distributed data partitions discussed above with regard to FIGS. 2-4 have been given in regard to a network-based service providing a transaction service, storage service(s), and other computing services that maintain data partitions. However, various other types of systems or services that may be implemented as separate or standalone systems may perform non-blocking processing for federated transactions for distributed data partitions.

Figure 5:
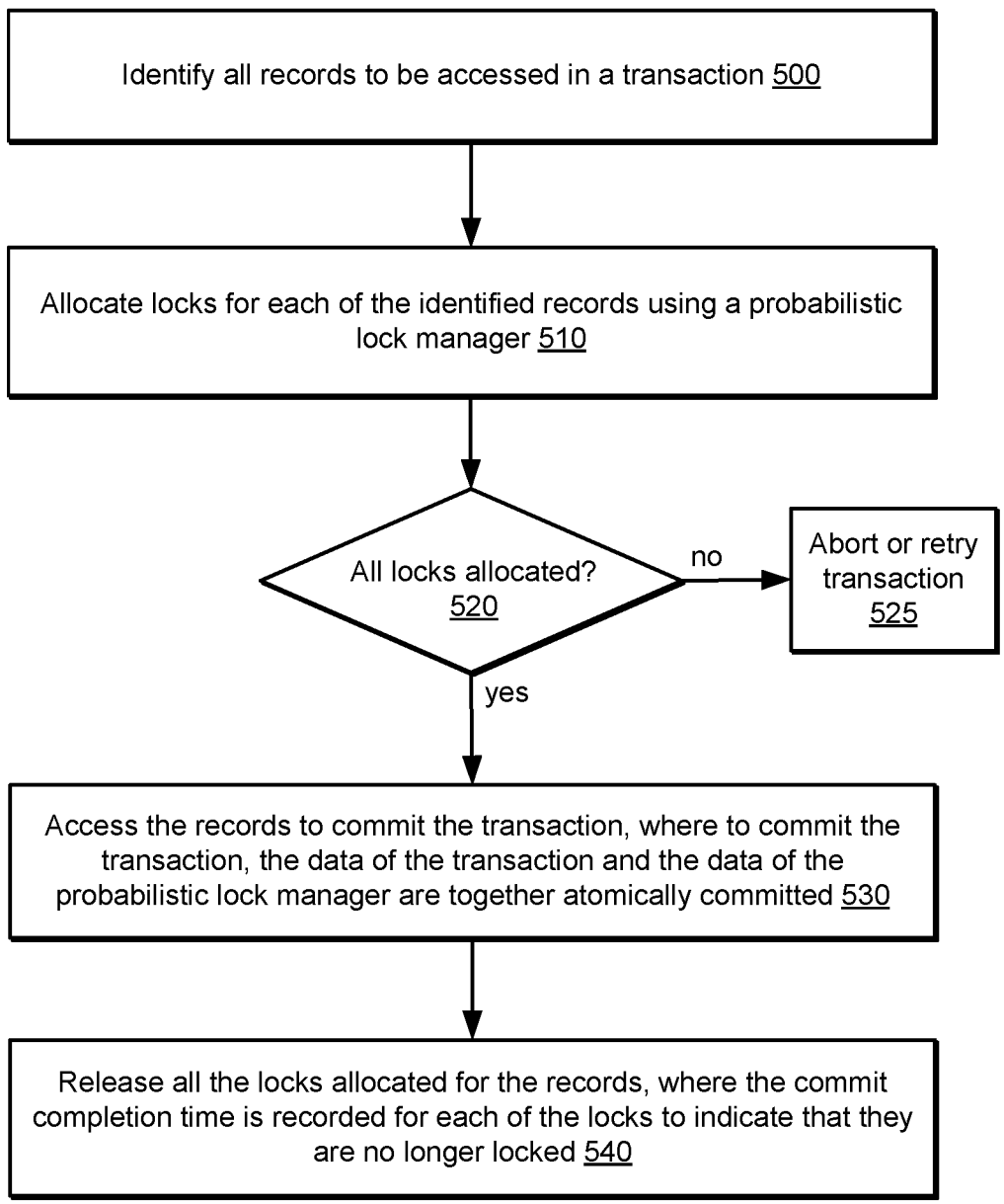
FIG. 5 is a high-level flowchart illustrating various methods and techniques for implementing a transaction using a probabilistic lock manager, according to some embodiments.

FIG. 5 is a high-level flowchart illustrating various methods and techniques for implementing a transaction using a probabilistic lock manager, according to some embodiments. The process begins where a transaction to be committed is analyzed to identify all records to be accessed by the transaction, as shown in 500. This analysis may be performed by a query engine, such as the query engine 224 of FIG. 2, or a transaction processor such as the transaction processor 150 of FIG. 1. As part of performing the transaction, each of the identified records may be locked, in various embodiments.

A lock for each of the identified records may then be formed such as is described above in FIG. 1. This lock acquisition process is further discussed in greater detail in FIG. 6 below. If locks for all identified records are successfully allocated, as shown as a positive exit from step 520, the process may proceed to step 530. If, however, locks for all identified records are not successfully allocated, as shown as a negative exit from step 520, the transaction may be abort, restarted or retried as shown in 525.

At step 530, after all locks have been successfully allocated, the transaction may be committed. As all accessed records are locked, this commit may be considered atomic. In addition, probabilistic data, such as the hash tables 120 of FIG. 1, may be atomically committed as part of the atomically committed data of the transaction.

Upon completion of the atomic commit operation, the process may then proceed to step 540, where all allocated locks for the transaction are released. To release the various locks, a respective controlling entry for each lock is updated to indicate an unlocked status and an associated last commit time for the controlling entry is set to the commit time for the transaction. Future lock requests for future transactions may then use these recorded last commit times to select a future controlling entry for a future record lock request. In some embodiments, the commit time records for the transaction may be set to a maximum value of the transaction commit time and a current time stored in the controlling entry.

Figure 6:
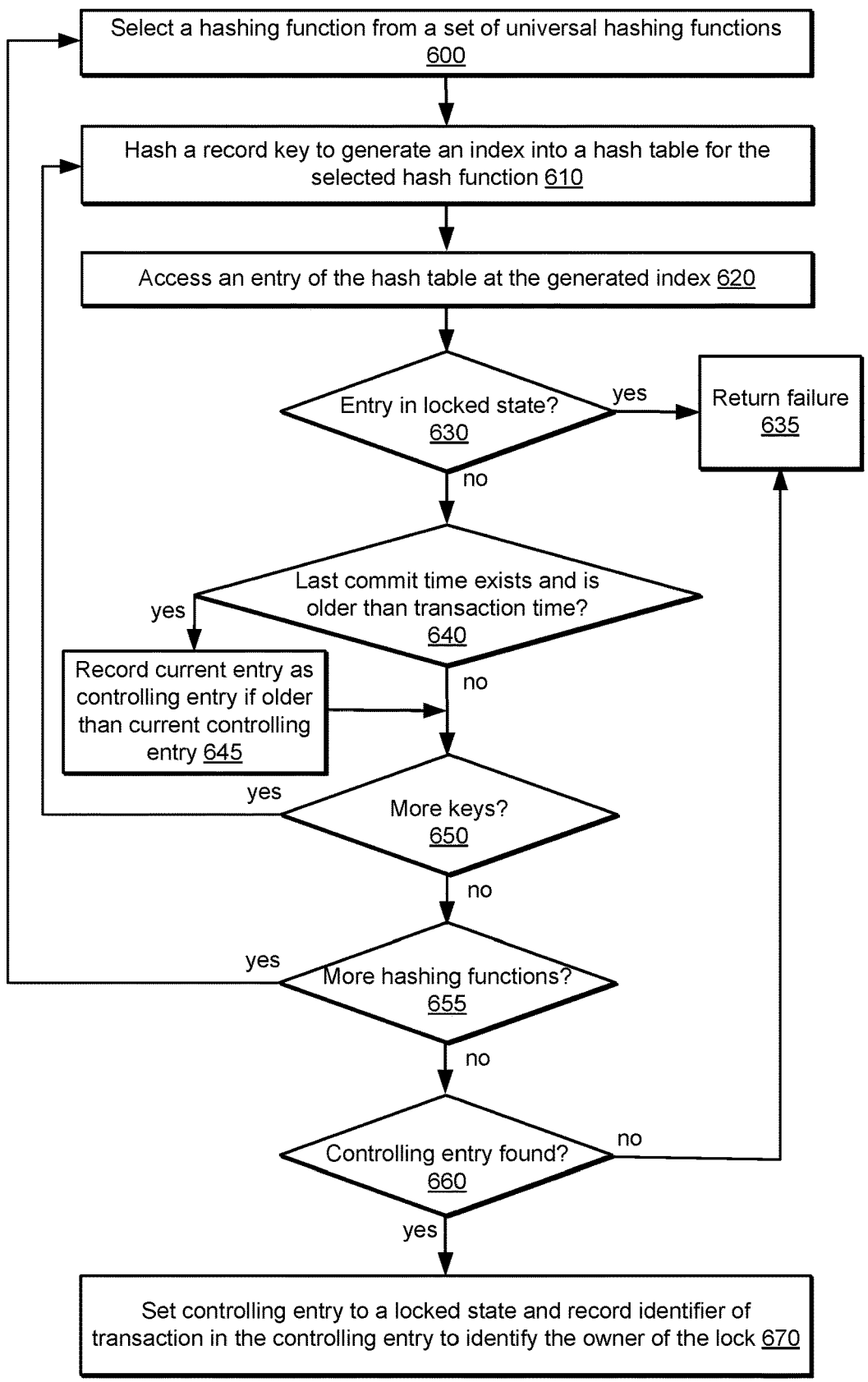
FIG. 6 is a high-level flowchart illustrating various methods and techniques for implementing a lock of a record using a probabilistic lock manager, according to some embodiments.

FIG. 6 is a high-level flowchart illustrating various methods and techniques for implementing a lock of a record using a probabilistic lock manager, according to some embodiments. The process begins at step 600 where a key for a record, such as the key(s) 111 as shown in FIG. 1, is identified for locking for a transaction, in some embodiments. Then, for each of multiple pairwise independent, hash functions, such as the hash functions 110 of FIG. 1, the hash function is applied to the key to generate an index into a respective hash table, such as the hash table 120 of FIG. 1, for the hash function, as shown in 610.

Then, as shown in 620 and entry at the generated index is accessed, in some embodiments. If this entry indicates a locked state, as shown as a positive exit from 630, the process returns an allocation failure, as shown in 635. If, however, this entry indicates an unlocked state, as shown as a negative exit from 630, the process proceeds to step 640.

As shown in step 640, if the entry identifies the lock as having never been allocated, or a last commit time is older than any previously seen last commit time, as shown as a positive exit from 640, the entry is recorded as a current controlling entry for the record, as shown in 645, and the process may then proceed to step 650. If, however, the last commit time is not older than any previously seen last commit time, as shown as a negative exit from 640, the process may then proceed directly to step 650, in some embodiments.

If more keys are to be processed, as shown in a positive exit at step 650, the process may return to step 610, in some embodiments. If no more keys are to be processed, as shown in a negative exit at step 650, the process may continue to step 655.

If more hashing functions are to be processed, as shown in a positive exit at step 655, the process may return to step 600, in some embodiments. If no more hashing functions are to be processed, as shown in a negative exit at step 655, the process may continue to step 660.

As shown in step 660, if a controlling entry is not found, as shown as a negative exit from 660, the process returns an allocation failure, as shown in 635. Such a condition may exist even if no identified entries are in a locked state as last commit times for all identified entries may not be older than the transaction time. If, however, a controlling entry is recorded, as shown in a positive exit from 660, the process may proceed to step 670 where the controlling entry may be set to a locked state, in some embodiments. In various embodiments, setting a controlling entry to a locked state may include recording an identifier of the transaction in the entry. The process may then return an indication of successful allocation.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable applications, while in other embodiments servers may include more, fewer, or different elements than computer system 1000.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the embodiments described herein. In another example, an instance of a server application executing on computer system 1000 may use network interface 1040 to communicate with other instances of the server application (or another server application) that may be implemented on other computer systems.

System memory 1010 may store instructions and data accessible by processor 1010. In various embodiments, system memory 1020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for providing a database compute node including a transaction manager (not shown) and a lock manager, as indicated at 1026, are shown stored within system memory 1020 as program instructions 1025. In some embodiments, system memory 1020 may include data store 1045 which may be configured to include a probabilistic data structure 1046 as described herein.

In some embodiments, system memory 1020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as between a client device and other computer systems, or among hosts, for example. In particular, network interface 1040 may allow communication between computer system 800 and/or various other device 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.7, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may be a storage host, and persistent storage 1060 may include the SSDs attached to that server node.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
   at least one processor and a memory storing program instructions that, when executed by the at least one processor, cause the at least one processor to implement a transaction processor configured to:
   allocate a lock of a record of a database for a transaction, wherein to allocate the lock the transaction processor is configured to:
   identify a last commit time for the record in view of a commit time stored in an entry of a count-min sketch (CMS) of a lock structure for the record, wherein the CMS comprises a plurality of entries, including the entry, respectively storing lock state values and commit times; and update the CMS to lock the record responsive to determining that the last commit time is earlier than a transaction time for the transaction, wherein to update the CMS the transaction processor is configured to update an entry of the plurality of entries of the CMS to indicate a locked state;

atomically commit the transaction and the CMS prior to releasing the lock of the record for the transaction; and release the lock of the record for the transaction subsequent to atomically committing the transaction and the CMS, wherein to release the lock the transaction processor is configured to update the entry to indicate an unlocked state with a commit time determined by completion of the atomic committing.

2. The system of claim 1, wherein the database comprises a plurality of records including the record, wherein a size of the lock structure for the database is independent of a number of the plurality of records of the database, and wherein the transaction processor is further configured to insert one or more records into the database without modifying the lock structure.

3. The system of claim 1, wherein to access the lock structure the transaction processor is configured to:

apply individual ones of a plurality of hash functions of the CMS to a key of the record to access respective entries, of the plurality of entries, of respective hash tables for the respective hash functions; and select a minimum commit time of respective commit times stored in the respective entries, the selected minimum commit time corresponding to the commit time of a selected entry.

4. The system of claim 1, wherein to update the CMS the transaction processor is configured to write the entry with a maximum value of the commit time stored in the entry and the commit time determined by completion of the atomic committing.

5. A computer-implemented method, comprising:

allocating a lock of a record of a database for a transaction, comprising:

identifying a last commit time for the record in view of a commit time stored in an entry of a count-min sketch (CMS) of a lock structure for the record, wherein the CMS comprises a plurality of entries, including the entry, respectively storing lock state values;

updating the CMS to lock the record responsive to determining that a last commit time is earlier than a transaction time for the transaction, wherein updating the CMS comprises updating an entry of the plurality of entries of the CMS to indicate a locked state; and atomically committing the transaction and the updated CMS.

6. The computer-implemented method of claim 5, wherein the database comprises a plurality of records including the record, and wherein a size of the lock structure for the database is independent of a number of the plurality of records of the database.

7. The computer-implemented method of claim 5, wherein accessing the lock structure comprises:

applying individual ones of a plurality of hash functions of the CMS to a key of the record to access respective entries, of the plurality of entries, of respective hash tables for the respective hash functions; and selecting a minimum commit time of respective commit times stored in the respective entries to determine the last commit time, the selected minimum commit time corresponding to a respective commit time of a selected entry.

8. The computer-implemented method of claim 5, wherein updating the CMS further comprises writing the entry with an identifier of the transaction.

9. The computer-implemented method of claim 5, further comprising allocating another lock of another record of the database for another transaction, comprising:

accessing the lock structure to identify another last commit time for the other record; and returning an allocation failure for the other transaction responsive to determining that the other last commit time is not earlier than another transaction time for the other transaction.

10. The computer-implemented method of claim 5, further comprising releasing the lock of the record for the transaction, the releasing comprising:

updating the entry to indicate an unlocked state; and writing the entry with a maximum value of the commit time stored in the entry and a commit time determined by completion of the atomic committing.

11. The computer-implemented method of claim 10, further comprising atomically committing the transaction and the updated CMS prior to releasing the lock of the record for the transaction.

12. The computer-implemented method of claim 5, further comprising inserting one or more records into the database without modifying the lock structure.

13. One or more non-transitory computer-accessible storage media storing program instructions that when executed on or across one or more computing devices cause the one or more computing devices to perform:

allocating a lock of a record of a data store for a transaction, comprising:

identifying a last commit time for the record in view of a commit time stored in an entry of a count-min sketch (CMS) of a lock structure for the record, wherein the CMS comprises a plurality of entries, including the entry, respectively storing lock state values;

updating the CMS to lock the record responsive to determining that the last commit time is earlier than a transaction time for the transaction, wherein updating the CMS comprises updating an entry of the plurality of entries of the CMS to indicate a locked state; and atomically committing the transaction and the updated CMS.

14. The one or more non-transitory computer-accessible storage media of claim 13, wherein the data store comprises a plurality of records including the record, and wherein a size of the lock structure for the data store is independent of a number of the plurality of records of the data store.

15. The one or more non-transitory computer-accessible storage media of claim 13, wherein accessing the lock structure comprises:

applying individual ones of a plurality of hash functions of the CMS to a key of the record to access respective entries, of the plurality of entries, of respective hash tables for the respective hash functions; and selecting a minimum transaction time of respective transaction times stored in the respective entries, the selected minimum transaction time corresponding to the last commit time.

16. The one or more non-transitory computer-accessible storage media of claim 13, wherein updating the CMS further comprises writing the entry with an identifier of the transaction.

17. The one or more non-transitory computer-accessible storage media of claim 13, comprising additional program instructions that when executed on or across the one or more computing devices cause the one or more computing devices to perform allocating another lock of another record of the data store for another transaction, comprising:
  accessing the lock structure to identify another last commit time for the other record; and
  aborting the other transaction responsive to determining that the last commit time is not earlier than a transaction time for the transaction.

18. The one or more non-transitory computer-accessible storage media of claim 13, wherein the program instructions that when executed on or across the one or more computing devices cause the one or more computing devices to further perform releasing the lock of the record for the transaction, comprising:
  updating the entry to indicate an unlocked state; and
  writing the entry with a maximum value of the commit time stored in the entry and the commit time determined by completion of the atomic committing.

19. The one or more non-transitory computer-accessible storage media of claim 18, comprising additional program instructions that when executed on or across the one or more computing devices cause the one or more computing devices to perform atomically committing the transaction and the updated CMS prior to releasing the lock of the record for the transaction.

20. The one or more non-transitory computer-accessible storage media of claim 13, comprising additional program instructions that when executed on or across the one or more computing devices cause the one or more computing devices to perform inserting one or more records into the data store without modifying the lock structure.

* * * * *